July 1, 1930.  C. LURTZ  1,769,884
TIMING DEVICE FOR BOILING EGGS
Filed Oct. 27, 1926  2 Sheets-Sheet 1
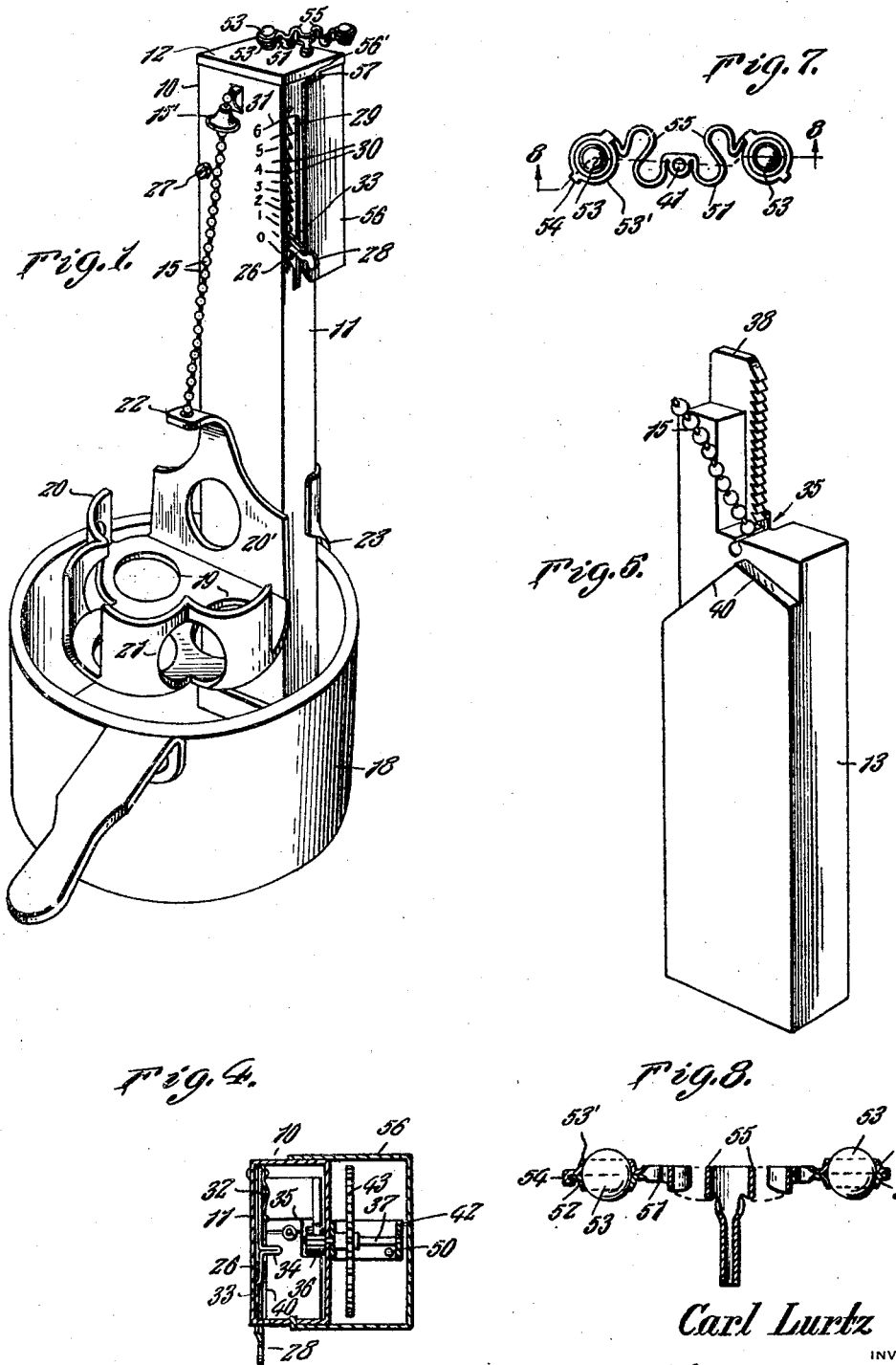
Carl Lurtz
INVENTOR July 1, 1930. C. LURTZ 1,769,884
TIMING DEVICE FOR BOILING EGGS
Filed Oct. 27, 1926 2 Sheets-Sheet 2
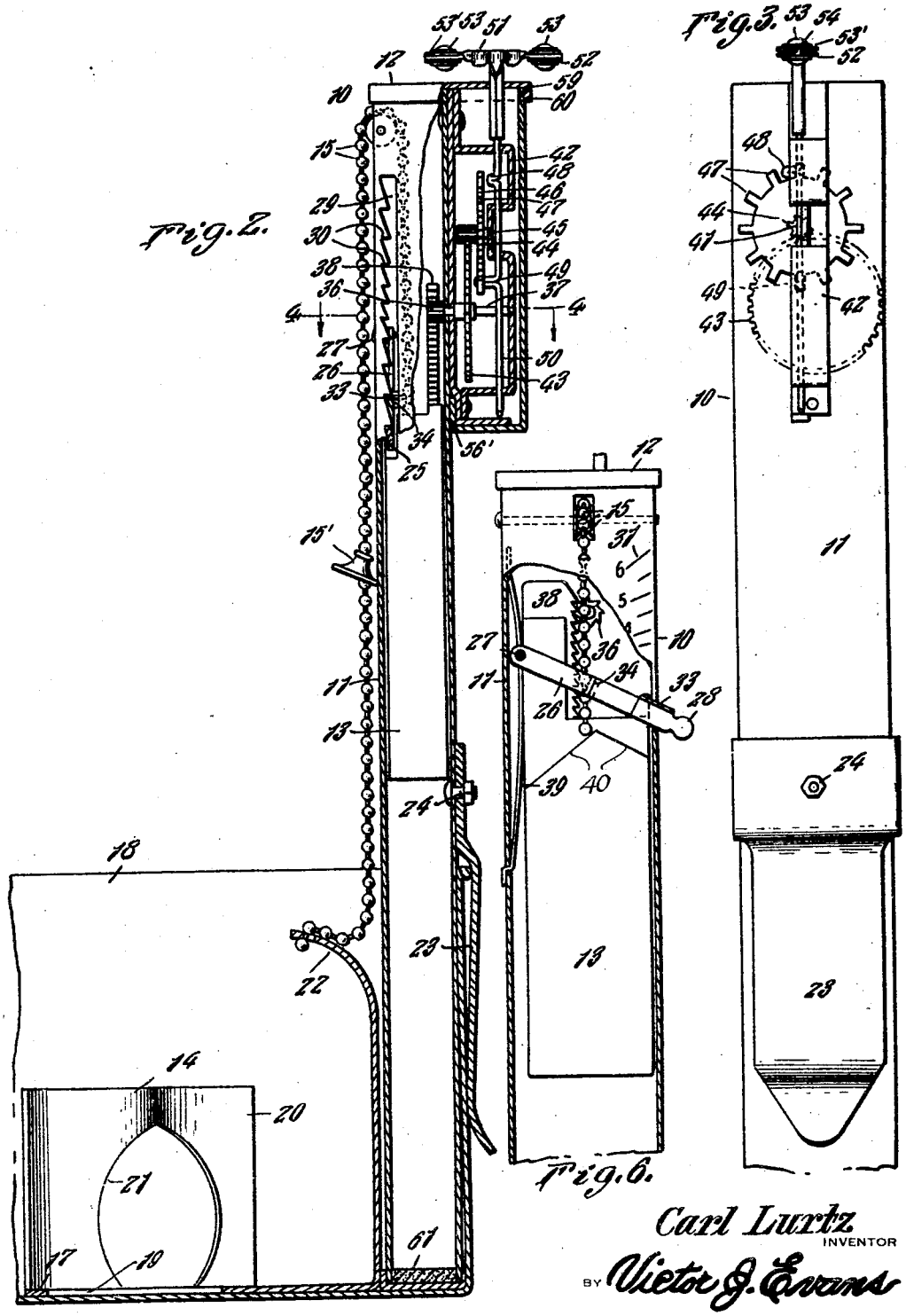
Carl Lurtz
INVENTOR Patented July 1, 1930

1,769,884

UNITED STATES PATENT OFFICE

CARL LURTZ, OF BROOKLYN, NEW YORK, ASSIGNOR, BY DIRECT AND MESNE ASSIGNMENTS, TO GOOD HOUSE KEEPING AIDS, INCORPORATED, OF BROOKLYN, NEW YORK, A CORPORATION OF NEW YORK

TIMING DEVICE FOR BOILING EGGS

Application filed October 27, 1926. Serial No. 144,562.

This invention relates to improvements in timing devices for boiling eggs.

The primary object of the invention resides in a device which may be set to automatically lift a tray of eggs out of a pan of boiling water at a predetermined time for which it is set to operate, thereby eliminating the necessity of having an attendant time the eggs and who must be ready to remove the eggs from the pan at the correct time.

Another object of the invention is to provide a weight operated mechanism for lifting the eggs from the water in which they are immersed for boiling, the weight mechanism being responsive to the set position of a timing means, and which weight mechanism is adapted to set the timing means in operation as the egg holder is pulled down into the water of the receptacle in which the eggs are to be immersed.

A further object of the invention is to construct a device of the character above mentioned which is simple in construction and inexpensive of manufacture for rendering the device suitable for household purposes, as it will be appreciated that the egg timers heretofore placed upon the market have been limited to restaurant and hotel use as the price of the same have been prohibitive and the size and construction makes them inconvenient for household purposes.

A still further object of the invention is to provide an egg timing device which may be applied to any cooking utensil and removed therefrom when not in use.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved timing device in position upon a cooking utensil, showing the position of the parts in an inoperative position.

Figure 2 is a vertical longitudinal sectional view therethrough but showing the position of the parts when in an operative position.

Figure 3 is a rear elevational view of the device with the casing enclosing the time controlled mechanism removed.

Figure 4 is a horizontal sectional view on the line 4—4 of Figure 2.

Figure 5 is a detail perspective view of the weight and rack bar.

Figure 6 is a fragmentary front elevational view with part of the casing broken away.

Figure 7 is an enlarged top plan view of the oscillating weights.

Figure 8 is a vertical sectional view on the line 8—8 of Figure 7.

Referring more particularly to the drawings, the reference numeral 10 designates my improved egg timing device in its entirety which includes a vertical tubular casing 11 which is closed at its bottom and provided with a removable cover 12 at its top. The casing is substantially rectangular in cross section to slidably receive a weight 13 which is connected to an egg holder 14 by means of a flexible member 15 in the nature of a chain or the like and which chain passes over a pulley 16 journalled in the front wall of the casing adjacent the top thereof. A finger grip 15' is mounted on the chain for grasping by the hand of an operator to place the device in operation and which grip engages the front wall of the casing when the weight is in a down or inoperative position.

The egg holder 14 comprises a horizontal tray 17 of a shape to fit within a cooking utensil 18, and which tray is provided with openings 19, the walls of which serve as seats for the eggs to be cooked. Spaced curved side walls 20 rise from the tray and are provided with finger openings 21 which serve to permit the hand of an operator to pick up the eggs from the tray after being cooked. The rear wall 20 extends higher than the other walls and is bent forwardly over the tray as at 22 and to which one end of the chain 15 is connected whereby the tray is suspended approximately on its center of gravity when the eggs are contained therein to effect an even balancing of the egg holder during its vertical movement.

For mounting the device upon the cooking utensil 18, I provide a spring clip 23 fixed to the rear wall of the casing by a bolt or rivet 24, the free end of the clip being curved in cross section to cause the vertical side edges thereof to frictionally engage the sides of the pan at spaced points to firmly support the device in a vertical position thereon. The upper end of the clip is relatively wider than the free end and is bent about the sides of the casing to impart an added strength to its connection therewith. When in position, the bottom of the casing rests upon the bottom of the pan, while the rear of the casing engages the inner side walls of the pan, while the clip engages the outside walls of the pan as clearly shown in Figures 1 and 2 of the drawing.

The device is provided with a time setting mechanism 25 which may be manually set to operate the device at various time intervals such as from one to six minutes or any other amount of minutes or half minutes which may come within this range. The mechanism 25 comprises a lever 26 pivoted to the front wall of the casing as at 27, and which has its manipulating or free end 28 extended out through an elongated slot 29 provided in one of the side walls of the casing. One of the walls of the slot 29 is provided with a series of teeth 30 adjacent each of which is provided an indicating mark 31 which indicates the number of minutes and half minutes for which the device may be set to operate. The indicating marks are inscribed on the front wall of the casing so as to be clearly visible at all times. A flat spring 32 supported by the pivot on which the lever is mounted, engages the lever to normally press the same into engagement with the toothed wall of the slot, but which lever may be manually flexed against the tension of the spring to move the same out of the path of the teeth for moving the lever vertically in the slot. The top edge of the lever is bent inwardly as at 33 to engage the desired teeth opposite the mark indicating the time at which the device is to be operated. An inwardly extending part 34 extends from the lever and is preferably bent therefrom for limiting the upward movement of the weight during its upward vertical movement to a set position.

As hereinbefore mentioned, the weight 13 is freely slidable within the casing 11 but has its rear face provided with a longitudinal groove or recess 35 for accommodating a ratchet pinion 36 fixed to a shaft 37, which shaft has one of its ends journalled in the rear wall of the casing. A rack bar 38 is mounted on the weight and has its ratchet teeth projecting over one of the side walls of the groove 35 for co-acting engagement with the pinion 36 when the weight is raised to an operative position. A flat bowed spring 39 has its lower end fixed to the casing and this spring presses against the weight to swing the same to cause the rack bar to be held in co-acting engagement with the pinion after the weight has been lifted to its operative position, and which spring allows the weight and rack bar to pass the pinion in its upward movement. After the weight reaches the limit of its upward movement, the spring 39 places a tension thereon until the last tooth of the rack bar disengages the pinion after which the weight 13 overcomes the tension of the spring 39 and falls to the bottom of the casing, which in turn lifts the egg holder vertically out of the boiling water in which it has been immersed for the purpose of boiling the eggs contained therein. One side of the top of the weight is cut-away at an inclination as at 40 to accommodate the angular positions of the lever 26, while the top of the rack extends slightly above the top of the weight so that several teeth of the rack will engage the pinion 36 when the lever 26 is set at its lowermost position, whereby it will take the rack one minute after being set before disengaging the pinion. It will be obvious that the higher the lever 26 is raised, the higher the weight may be moved, hence the pinion will engage more teeth of the rack and subsequently will require longer time until the said rack disengages the pinion, consequently the operator may control the periods of time at which the device may be operated.

The timing mechanism for releasing the weight from its raised position comprises an escapement mechanism 41 which includes a bracket 42 mounted on the rear wall of the casing and having a portion bent inwardly to provide a bearing for the shaft 37 hereinbefore mentioned. The shaft 37 has a gear 43 fixed thereon, which is larger in diameter than the pinion 36 and which meshes with a relatively small gear 44 fixed to a shaft 45 also journalled in the bracket and being disposed above the shaft 37. A relatively large escapment wheel 46 is also fixed to the shaft 45, the peripheral edge of which is provided with spaced radially extending pins 47 for engagement by fingers 48 and 49 bent from a verge or vertical shaft 50 journalled in the top, bottom and inwardly bent portion of the bracket 42 and resting upon a lip 51 disposed below the lowermost bearing of the bracket. The fingers 48 and 49 are disposed radially of the axis of the verge but extend at right angles to each other for respective engagement with the pin on the escapement wheel 46 on opposite sides of the horizontal axis of said wheel. The top of the verge carries a resilient cross arm 51 bent from a single piece of material to provide seats or rings 52 at opposite ends for receiving a pair of balls or weights 53. Flanges 53' are stamped from the same piece of material and are bent to fit down over the balls for holding them down upon their respective seats, while lips 54 on the flanges engage the rings for locking the flanges therewith. The arm 51 is bent into a double S shape as at 55 so that the weights may be moved toward or away from the axis of the verge to regulate the speed of oscillation by compressing or expanding said arm.

The timing mechanism is enclosed within a removable cover 56, the lower wall of which has a tongue 56′ which fits between the rear wall of the casing 11 and the bracket 42. The sides of the cover overlap the sides of the casing and which sides are provided at their top with inwardly bent portions 57 for reception in slots 58 provided in the top of the side walls of the casing. The cover 56 also has a slot 59 in its rear wall for the reception of a tongue 60 on the top cover 12. This serves to firmly lock the cover in position to conceal the timing mechanism, but if desired, the cover may be removed for access to the several parts enclosed therein. The cover 12 hereinbefore mentioned also serves to close the top of the escapement mechanism and is provided with a slot for the passage of the vedge to a position above the casing.

For absorbing the shock at the bottom of the casing as the weight drops, I provide a cushion of cork or rubber 61 at the bottom thereof.

In practice, the time control mechanism is set for the desired time at which the device is to operate, and we shall presume that it is desired to cook the eggs for a period of three minutes. The lever 26 is moved to a position to engage the tooth adjacent the numeral 3 after which the eggs are placed in the tray, and the tray immersed in the water contained within the pan, by pulling upon the manipulating element 15 until the top of the weight 13 engages the inwardly bent portion 33 of the lever, which limits the upward movement of the rack. The tendency of the weight 13 being to drop is prevented from doing so by reason of the escapement mechanism which permits the lowering of the weight at a slow rate, until the last tooth of the rack bar 38 has passed from engagement with the pinion. As the rack leaves the pinion, the weight 13 drops and accordingly lifts the egg holder out of the pan, from where the eggs may be removed by an operator.

From the foregoing description, it will be seen that I have constructed an egg timing device which may be set and left without necessitating the attendance of an operator and at the expiration of a specified time, the eggs will be removed from the water in which they are cooked. The device is so constructed as to be simple in construction and inexpensive of manufacture, whereby it will prove a practical appliance for household purposes.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In an egg timing and lifting device, a hollow casing, a weight slidable in said casing, a flexible lever pivoted in said casing, an inwardly extending portion formed with said lever for engagement with the top of said weight to limit the upward movement thereof, the free end portion of said lever extending through a slot in said casing, an inwardly bent portion formed on said lever, said weight having its top cut-away at an inclination to provide a flat seat for said lever, a series of teeth formed with one wall of said slot for selective engagement with said inwardly bent portion of said lever for securing the said lever in a fixed position for limiting upward movement of said weight.

2. In an egg timing and lifting device, an egg tray adapted to be arranged in a utensil and being provided with openings for forming seats for eggs, spaced curved side walls included in said tray and being formed with finger receiving openings, a flat rear wall extending above the side walls and having its upper portion bent forwardly over said tray, the flat wall of said tray adapted to ride against the flat side of said casing while the forwardly bent portion is adapted to be connected with a pull chain by which said tray may be lifted relative to said casing against which it rides.

3. In an egg timing and lifting device, a weight for free sliding movement within a casing and being provided with a longitudinal groove in one of the sides thereof, and rack teeth provided on said weight, and projecting inwardly beyond one of the side walls of said groove but not extending the entire length thereof, whereby the pinion of a timing mechanism may operatively engage said rack teeth when moved into engagement therewith and said weight may be subsequently moved past the pinion free of the same by the passage of the pinion through said longitudinal groove.

In testimony whereof I have affixed my signature.

CARL LURTZ.